US011816617B2

(12) United States Patent
Gerber et al.

(10) Patent No.: US 11,816,617 B2
(45) Date of Patent: Nov. 14, 2023

(54) BUSINESS PROCESS MODELING RECOMMENDATION ENGINE

(71) Applicant: SAP SE, Walldorf (DE)

(72) Inventors: Andreas Gerber, Königsbach (DE); Diana Sola, Heidelberg (DE)

(73) Assignee: SAP SE, Walldorf (DE)

( * ) Notice: Subject to any disclaimer, the term of this patent is extended or adjusted under 35 U.S.C. 154(b) by 489 days.

(21) Appl. No.: 17/092,139

(22) Filed: Nov. 6, 2020

(65) Prior Publication Data

US 2022/0147842 A1 May 12, 2022

(51) Int. Cl.
*G06Q 10/0633* (2023.01)
*G06Q 10/067* (2023.01)
*G06F 9/451* (2018.01)

(52) U.S. Cl.
CPC ......... *G06Q 10/0633* (2013.01); *G06F 9/451* (2018.02); *G06Q 10/067* (2013.01)

(58) Field of Classification Search
CPC ... G06N 5/025; G06F 9/451; G06F 16/24578; G06F 16/248; G06Q 10/0633; G06Q 10/067; G06Q 10/101
USPC ...................................... 705/7.27
See application file for complete search history.

(56) References Cited

U.S. PATENT DOCUMENTS

| | | | |
|---|---|---|---|
| 2013/0035976 A1* | 2/2013 | Buffett | G06F 17/40 705/7.26 |
| 2013/0093771 A1* | 4/2013 | Simitsis | G06T 11/206 345/440 |

OTHER PUBLICATIONS

Buffett, Abductive Workflow Mining Using Binary Resolution on Task Successor Rules, Rule Representation, Interchange and Reasoning on the Web: International Symposium, RuleML 2008, Orlando, FL, USA, Oct. 30-31, 2008, Proceedings 2, pp. 47-57 ) (2008) (Year: 2008).*

Dehaspe et al., "Discovery of Relational Association Rules," Relational Data Mining, pp. 1-24 (2001).

Galárraga et al., "AMIE: Association Rule Mining under Incomplete Evidence in Ontological Knowledge Bases," International World Wide Web Conference Committee, May 13-17, 2013, Rio de Janeiro, Brazil, pp. 413-422.

Jannach et al., "Supporting the Design of Machine Learning Workflows with a Recommendation System," ACM Trans. Interact. Intell. Syst., 6(1):Article 8, pp. 1-35 (2016).

(Continued)

*Primary Examiner* — Charles Guiliano
(74) *Attorney, Agent, or Firm* — Buckley, Maschoff & Talwalkar LLC (57) ABSTRACT

A software-based process modeling tool is provided that labels and links a plurality of activities forming part of a process that is being modeled include a recommendation engine. With the modeling tool, the activities are each represented as a node in the graphical user interface. A recommendation engine is polled with information characterizing the labeled activities and their corresponding links to obtain a plurality of ranked recommendations for an unlabeled node representing a next activity in the process for selection by a user. The recommendation engine applies the information characterizing the labeled activities and their corresponding links to a plurality of rules each having a corresponding confidence value. The plurality of rules is generated using a plurality of rule templates as applied to a plurality of historical processes each comprising a plurality of labeled and linked activities.

20 Claims, 6 Drawing Sheets

(56) References Cited

OTHER PUBLICATIONS

Kluza et al., "Overview of Recommendation Techniques in Business Process Modeling," 9th Workshop on Knowledge Engineering and Software Engineering (KESE), 36th German Conference on Artificial Intelligence, Sep. 17, 2013, pp. 1-12 (2013).

Wang et al., "RLRecommender: A Representation-Learning-Based Recommendation Method for Business Process Modeling," Service-Oriented Computing, International Conference on Service-Oriented Computing 2018, Lecture Notes in Computer Science, Pahl et al. eds, pp. 478-486 (2018).

Zhang et al., "Explainable Recommendation: A Survey and New Perspectives," Foundations and Trends in Information Retrieval, 14(1):1-101 (2020).

* cited by examiner

BUSINESS PROCESS MODELING RECOMMENDATION ENGINE

TECHNICAL FIELD

The subject matter described herein relates to a recommendation engine for use with a software-based business process modeling tool that recommends a next activity forming part of a business process that is being modeled.

BACKGROUND

Modeling business processes can be time-consuming and error-prone, especially for inexperienced users. In particular, difficulties can arise when logically identifying and defining related nodes forming part of a business process under development. In addition, modeling a domain-specific process can be challenging in that such processes may require a specialized and sometimes technical vocabulary in order to be implemented in a consistent manner.

SUMMARY

In a first aspect, user-generated input is received via a graphical user interface forming part of a software-based process modeling tool that labels and links a plurality of activities forming part of a process that is being modeled. With the modeling tool, the activities are being represented as a node in the graphical user interface. A recommendation engine is polled with information characterizing the labeled activities and their corresponding links to obtain a plurality of ranked recommendations for an unlabeled node representing a next activity in the process. Thereafter, at least a portion of the ranked activity recommendations is displayed in the graphical user interface. Subsequently, second user-generated input is received via the graphical user interface selecting one of the displayed ranked activity recommendations. The unlabeled node is then labeled in the graphical user interface with an activity corresponding to the selected displayed ranked recommendation. The recommendation engine applies the information characterizing the labeled activities and their corresponding links to a plurality of rules each having a corresponding confidence value. The plurality of rules is generated using a plurality of rule templates as applied to a plurality of historical processes each comprising a plurality of labeled and linked activities.

Each historical process can be represented as a business process graph. In turn, each business process graph can be represented as a set of logical formulas.

For each node n of the business process graph corresponding to the process being modeled, a unary predicate $\lambda_n$ can be used that corresponds to the label $\lambda(n)$ of n and a formula $\lambda_n(n)$ can be added.

For each relation type rel between two nodes n≠m of a business process graph describing the structure of a given process model, a binary predicate rel can be used and for each pair of nodes n≠m of the business process graph that are in a relation described by relation rel a formula rel (n, m) can be added.

A set of rule templates can be defined for which all occurring rule instantiations are generated and confidences of the generated rules are computed.

The rules have a form of a Horn rule. The rules are used to predict the labels of activities within the process being modeled.

Each rule template can include a head and a body. Each head can include a unary predicate indicating a label of a corresponding activity node in a business process graph. Each body can include binary predicates indicating interrelationships between two nodes of the business process graph and unary predicates each indicating labels of a node in the business process graph.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced activity recommendation techniques for use in a business process modeling tool. Such advances were shown to provide improved accuracy as compared to other recommendation techniques including those using machine learning or embeddings.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a rule-based activity recommendation approach for modeling processes (e.g., business processes, etc.) which suggests suitable activities to extend the process model that is being edited in a software-based modeling tool at a user-defined position within the process. Rules as provided herein are useful in that they offer an additional explanation for a recommendation, which can be useful in cases where a user might be torn between two alternatives for a next activity within a process.

Business processes exist in every organization, from hospitals to financial institutions and from family businesses to global enterprises. They are the center point of Business Process Management, which is the art and science of overseeing how work is performed in an organization to ensure consistent outcomes and to take advantage of improvement opportunities. A business process refers to a set of logically related activities performed to achieve a defined business outcome. A typical example of a business process is the order-to-cash process carried out by a vendor, which starts when a customer submits an order to purchase a product or a service and ends when the product or service in question has been delivered to the customer and the customer has paid the corresponding invoice.

A business process model as provided herein is the graphical representation of an organization's business process and hence an important instrument for Business Process Management. When modelling a business process, it is important to precisely label the individual elements such that the process is consistent and unambiguous. In the case of domain-specific processes, this might require using a specialized and sometimes technical vocabulary, which often turns out to be challenging. There are a lot of tools supporting the modeling of business processes in a graphical notation such as Business Process Model and Notation (BPMN) or Petri Nets. Usually, they are graphical editors providing the user with a repository of symbols, which represent the building blocks of the underlying modeling language. However, business process modeling remains time-consuming and error-prone, especially for inexperienced users. The modeling task can be facilitated by providing features which assist users during modeling and make recommendations on how to complete a being edited business process model. Ideally, the assistance approach is context-aware, which means that it takes the current progress of modeling as a context for the recommendation into account. The basis for such a recommendation feature could be a repository of completed business process models.

One possible recommendation approach in business process modeling is activity recommendation. Given the business process model being worked on, the recommendation system makes suggestions regarding suitable activities to extend the model at a user-defined position. In other words, the system recommends proper activities to support the user modeling business processes in an iterative way.

Figure 1:
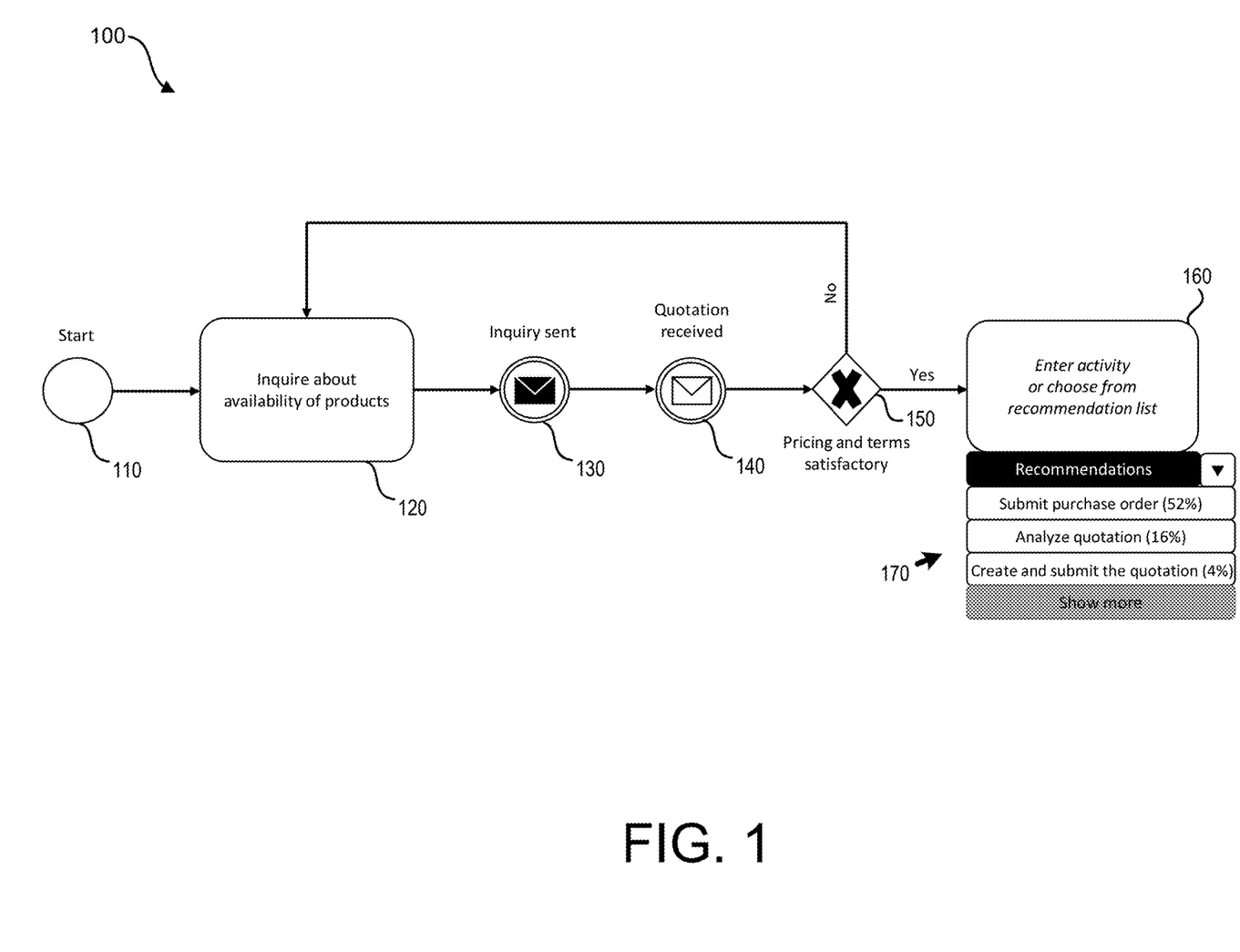
FIG. 1 is a diagram illustrating a business process model under development in a graphical user interface of a software-based process modeling tool.

FIG. 1 is a diagram 100 illustrating a graphical interface view of a software-based process modeling tool in relation to a business process model that is currently being developed. The business process model being developed can include a plurality of nodes 110-160 that correspond to activities forming part of the business process model (and in this example, a computer-implemented business process). These nodes 110-160 can be generated using an activity palette or other GUI element forming part of the graphical user interface in which nodes can be placed within the view and labeled with a particular activity (such labeling may be user-generated after placing the node in the view or it may be associated with a particular type of node selected by the user). In some variations, the user can select a label from a list of pre-defined activity labels. The process can start at a first node 110 and include a second node 120 relating to a user-generated request sent over a computer network encapsulating an inquiry about availability of a product. The second node 120 is linked to a third node 130 in which data encapsulating an inquiry is sent to a supplier over a computer network. Thereafter, a linked fourth node 140 can relate to the receipt of a quotation/response from the sent inquiry. A fifth node 150 can relate to customer-based acceptance of the pricing and terms (by sending data relating to same to the customer over a computer network). If such pricing and terms are rejected, then the inquiry process continues again at node 120. In this particular figure, the modeler has just added the sequence flow with label 'Yes' with an unlabeled node 160. The task of the recommendation engine is to find a suitable activity at this position. Since the business process model that has been developed so far depicts a version of the order-to-cash process, the recommender system suggests activities in a GUI element 170 such as a drop down list that have also been used in similar order-to-cash processes in the repository: 'Submit purchase order', 'Analyze quotation' and 'Create and submit the quotation'. The modeler can select one of these recommendations which causes node 160 to be rendered as the selected activity. A similar arrangement can be provided by the software-based modeling tool for business processes that are not wholly computer-implemented.

Business process activity recommendation presents a multi-class classification problem, where each activity that has been used in the repository corresponds to a possible target class.

Business process activity recommendation can be framed in terms of a knowledge graph completion task (sometimes also referred to as link prediction). Within the current framework, the process repository and the incomplete process have to be understood as a (large) graph and the recommendation of an appropriate activity has to be understood as the completion task.

While approaches that are based on embeddings dominate knowledge graph completion, more recently rule-based approaches, which have their origin in the field of inductive logic programming, have shown to be competitive. As an additional benefit, these approaches offer an explanation for the given recommendation. Explainable recommendations have recently attracted more and more interest since they help to improve the transparency, persuasiveness, effectiveness, trustworthiness, and satisfaction of recommendation systems. With the current subject matter, logical rules are learned that describe how activities are used in the given process repository. These rules can be used to recommend an appropriate activity at a given position. The current rule learner is based on a top-down search implemented in association rule mining systems such as WARMR and AMIE. The current implementation supports a specific language and rule templates designed for predicting activities which provides technical advantages over conventional rule-based techniques.

Business Process Models and Business Process Graphs. Various modeling notations as Petri nets or BPMN are available to capture business processes and the current subject matter can utilize any such notations. As provided herein for illustration, a business process model can correspond to a directed attributed graph as described in Definition 1.

Definition 1 (Business process graph, Pre-set, Post-set, Source node, Sink node). Let L be a set of labels. A business process graph is a tuple (N, E, λ), where:

N is a set of nodes,

E⊆N×N is a set of edges, and

λ:N→L is a function that maps a node to a label.

Now let B=(N, E, λ) be a business process graph and n∈N be a node in B. The pre-set (post-set) of n is defined as the set of nodes $$n = \{m \in N | (m, n) \in E\} \quad (n\bullet = \{m \in N | (n, m) \in E\}).$$

A node is called source node, if its pre-set is empty. Analogously, a node is called sink node if its post-set is empty.

During the abstraction of a BPMN model, a Petri net, or a process model in any other representation language to a business process graph, certain types of nodes may be dropped. In the case of Petri nets for example, transitions correspond to activities and thus, a business process graph can only include transitions. As transitions in a Petri net are only connected indirectly via a place or several places in between, it must be explicitly specified how to set-up E in the abstract representation of a Petri net. An edge (m, n) can be added to E if there exists a place p such that there is an arc from m to p and an arc from p to n in the Petri Net. The resulting relation between m and n is called 'direct after', i.e. n is 'direct after' m for every (m, n)∈E.

It is possible to capture the semantics of a Petri net more precisely by translating Petri nets into a representation with different types of relations (instead of storing one relation type in E). This arrangement can be used to distinguish between 'always direct causal' and 'sometimes direct causal' as more specific variants of the 'after' relation, or to consider additional relation types that describe, for example, the concurrency of activities.

Figure 2:
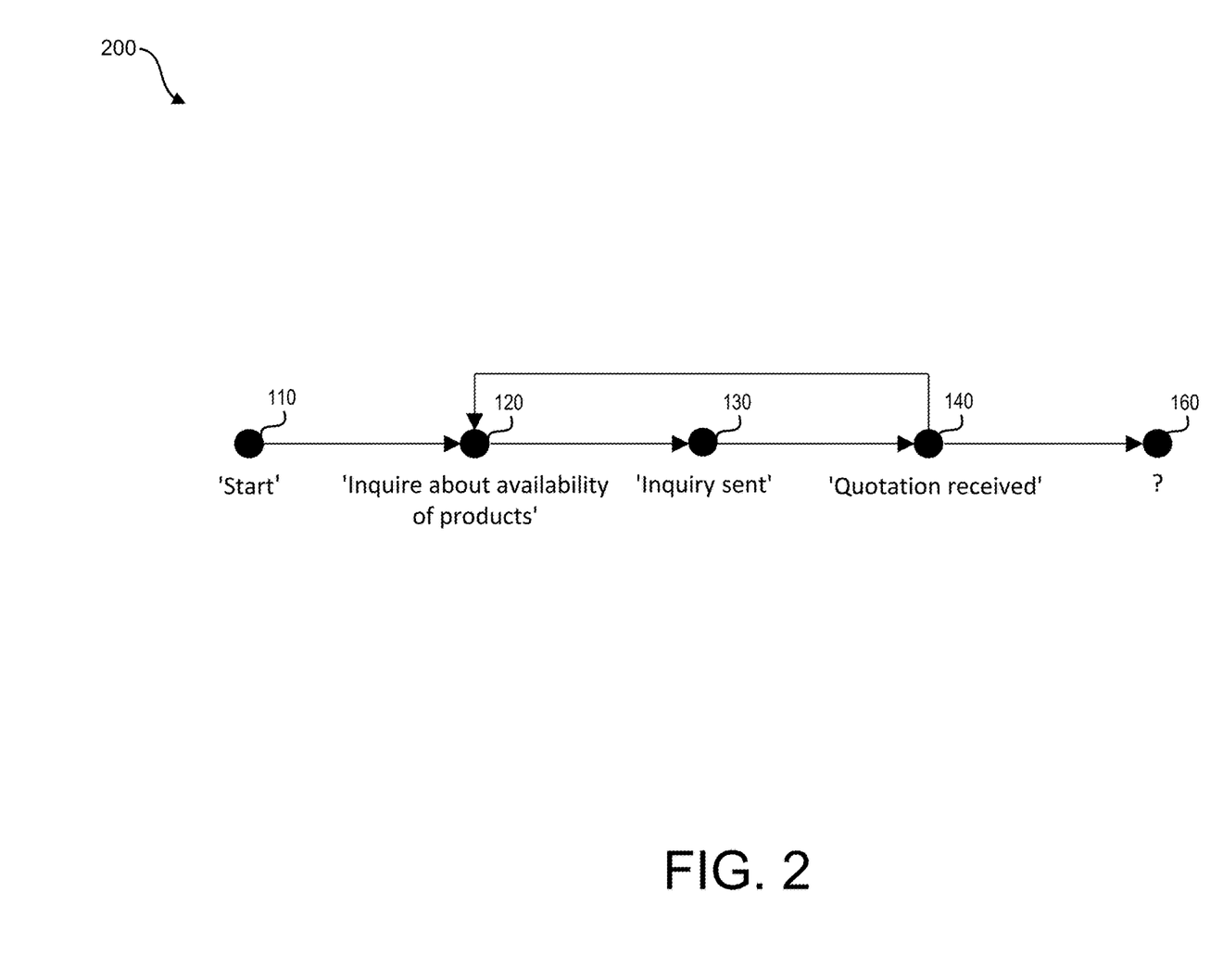
FIG. 2 is a diagram illustrating a business process graph corresponding to the business process model of FIG. 1.

If BPMN is the modeling notation in use, activities and events can be represented as nodes in the business process graph. FIG. 2 is a diagram 200 that shows a business process graph which results from the abstraction of the partial order-to-cash process model in FIG. 1. Each node can be annotated with its label. While some details are suppressed in the abstract representation, the overall structure and sequence of activities is preserved.

With the concept of the abstraction of a business process model to a business process graph at hand, background regarding the activity recommendation problem is provided. The base situation of the problem is that a user is about to model a business process. Given the current status of the business process model under development, the task of the activity recommender (which is displayed within the graphical user interface of the modeler tool) is to suggest suitable activities to extend the model at a user-defined position. A repository of completed business process graphs B can serve as the basis for any recommendation. Set L can refer to the activity labels used in the completed business processes.

FIG. 2 illustrates an exemplary situation of the activity recommendation problem. The user has already included four nodes with the labels 'Start', 'Inquire about availability of products', 'Inquiry sent' and 'Quotation received'. Now she wants to extend the model after the node with label 'Quotation received'.

As the position of the activity that has to be recommended is given by the user, the activity recommendation problem breaks down to find a suitable label for the so far unlabeled activity node. The choice of an appropriate label is narrowed to the set L of activity labels that have already been used in the repository of completed business process graphs. This observation leads to the following definition.

Definition 2 (Activity recommendation problem). Let B be a set of business process graphs and L be the set of activity labels that are used in the business process graphs in B. Let B=(N, E, λ) be a given incomplete business process graph, where each node n∈N except one node n̂ is labeled, i.e. λ(n) is given for all n∈N\ {n̂}. The activity recommendation problem is to find a suitable label λ(n̂)∈L of n̂.

The definition of the activity recommendation problem does not explicitly state that the current modeling status of the incomplete business process graph should be considered when determining an appropriate activity. However, business process modeling is usually an incremental process and a recommendation strategy should therefore take the current progress of modeling as a context into account.

In Definition 2, activity recommendation is defined as the task to find a suitable label for a particular node. This leads to the question of how to evaluate the effectiveness of a method in solving this problem. The most realistic way to evaluate an activity recommendation method would be observing a user editing a process and giving recommendations on demand, or at each new node. Then one could count how often these suggestions have been accepted, and if so, where they have been ranked in the provided recommendation list. However, this would only be possible in an effortful laboratory study.

Alternatively, the modeling process can be simulated with a 'given-n' evaluation in which the dataset is split into training and test subsets. For every business process graph in the test set, all nodes which longest path to a start node has length n+1 are determined. Then one of these nodes is chosen as the activity that has to be predicted, which is then hidden together with all other activities of the process except of the n preceding nodes. At this point, it is evaluated whether the recommendation method suggests the hidden (n+1)th activity and where it is ranked in the recommendation list. By increasing the value of n step by step, the incremental development of the business process model can be simulated. This evaluation method is user-independent and can be done post-hoc on large datasets.

For the given-n evaluation, it is needed to determine the n activities that were inserted before the hidden activity. Since no information is available about how the process was actually constructed, it can be assumed that the processes are generally created from 'left-to-right'. For each activity of a business process graph included in the test set, the preceding activities can be determined by following the incoming edges of the node until a source node is reached. Here, use can be made of the activities' pre-sets. In case that there are multiple input paths for an activity, the longest path can be chosen. Once the input paths for every activity in the business process graph have been determined, the method can be evaluated on the activities with input path length equal to n. The longest path to a hidden activity determined in this way also serves as context for the recommendation since it reflects the current stage of the modeling process.

The given-n evaluation method allows to compare different methods in the 'cold-start' setting, in which little information is given for the recommendation process. However, it is also important to evaluate methods in the case of more given information. For this purpose, the hide-last-two evaluation method is well suited. For every business process graph in the test set, one sink node and one preceding activity are randomly chosen and hidden. The preceding activity has to be predicted using all other activities that are not hidden, which again serve as a context for the recommendation.

In the given-n setting, a prediction is made based on the n preceding activities, where the preceding activities are determined by following the incoming edges of the node until a source node is reached. Instead of this depth-first search inspired determination of given activities, one could also determine them based on a breadth-first search. This idea leads to the vertical-cut evaluation method. For every business process graph in the test set, one activity, which is neither source nor sink node, is randomly chosen as the one to be predicted. Then the length s of the shortest path from the chosen activity to any source node is determined. All activities that are on a path of length s starting from any source node are used as a context for the prediction and all other activities are hidden.

Other evaluation methods can be used including those that do not require any assumptions about the insertion order of the activities in the business process. Rather, only the post-sets of activities need to be determined. The recommendation method can be evaluated for every activity which is part of a business process graph in the test set, except of sink nodes. For each of these activities, it can be determined if the recommendation method correctly suggests the hidden subsequent activity and where it is ranked in the recommendation list. If there is more than one activity in the post-set, a recommendation list can be generated for each of those activities, which includes all predicted activities except the other nodes from the post-set ('filtered recommendation'). For an exemplary activity a with post-set {b, c}, this results in deleting c from the recommendation list when evaluating if the recommendation method correctly suggests b as a successor of a. Accordingly, b can be deleted from the recommendation list for c given a.

A set of business process models B can be provided that are each formalized in terms of the abstract business process graph described in Definition 1. The goal is to learn rules which capture regularities that appear in the use of labels within B. For that purpose, constants and predicates to describe B in terms of logical formulas need to be established. $B=(N, E, \lambda) \in \mathcal{B}$ can be translated as follows.

(1) For each edge (m, n)∈E a formula after (m, n) is added.

(2) For each node n∈N a predicate $\lambda_n$ is used that corresponds to the label $\lambda(n)$ of n and a formula $\lambda_n$ (n) is added.

(3) For each pair of nodes n≠m∈N a formula inSameProcess(n, m) is added and a formula inSameProcess(m, n) is added to express that n and m appear in the same model.

The above translation means that two binary predicates are used to describe the structure of the given process models, and as many unary predicates as there are different labels used in the whole set B. Note that some of the labels can be expected to be shared across the models in B. This means that the same unary predicates can be used to describe the labels of nodes that appear in different process models, while the nodes themselves belong always to exactly one process model. With some implementations, it is possible to capture the semantics of a business process model into a representation with different types of relations. 'Causal' relations such as 'directAlwaysCausal' and 'sometimesDirectCausal' can be used for example, where the formulas directAlwaysCausal (m, n) and sometimesDirectCausal (m, n) are added instead of after (m, n). 'Concurrent' relations such as 'neverConcurrent', 'sometimesConcurrent' and 'alwaysConcurrent' can additionally be considered by adding the formulas alwaysConcurrent (m, n), sometimesConcurrent (m, n) and neverConcurrent (m, n).

In the following μ, v and w can be used to refer to place holders for certain unary predicates that correspond to the label of an activity. With the current subject matter, a special form of horn rules is of interest. In particular, there is interest in rules that have the form u(x)← . . . , which are rules that predict the label of an activity.

A possible way to solve the rule learning problem is to define a refinement operator that tells the learning algorithm to specialize a rule as u(x)←by adding step by step atoms to the body of the rule. The definition of the refinement operator specifies implicitly a wide range of possible rules that can be constructed by the repeated application of the operator. A different approach can be implemented in order to maintain full control over the types of rules that are generated. For this reason, a set of rule patterns or templates are defined for which all possible instantiations are generated. Example rule templates include:

$$u(X) \leftarrow \text{inSameProcess } (X,Y), v(Y) \quad (1)$$

$$u(X) \leftarrow \text{after } (X,Y), v(Y) \quad (2)$$

$$u(X) \leftarrow \text{inSameProcess } (X,Y), v(Y), \text{inSameProcess } (Y,Z), w(Z) \quad (3)$$

$$u(X) \leftarrow \text{after } (X,Y), v(Y), \text{inSameProcess } (Y,Z), w(Z) \quad (4)$$

$$u(X) \leftarrow \text{after } (X,Y), v(Y), \text{after } (Y,Z), w(Z) \quad (5)$$

It is also possible to include rule templates with more relations than one (templates (1) and (2)) or two relations (templates (3) to (5)). When instantiating these rule templates, u, v, and w can be replaced by all possible label predicates created from |L|. This means that there are $|L|*(|L|-1)\approx|L|^2$ different instantiations of templates (1) and (2) and $\approx|L|^3$ instantiations of the other rule templates. Note that rules can be interpreted under object identity so that different variables have to be grounded by different values. Thus, the constraint X≠Y and if required Y≠Z and X≠Z can be added to the body of each rule.

Figure 3:
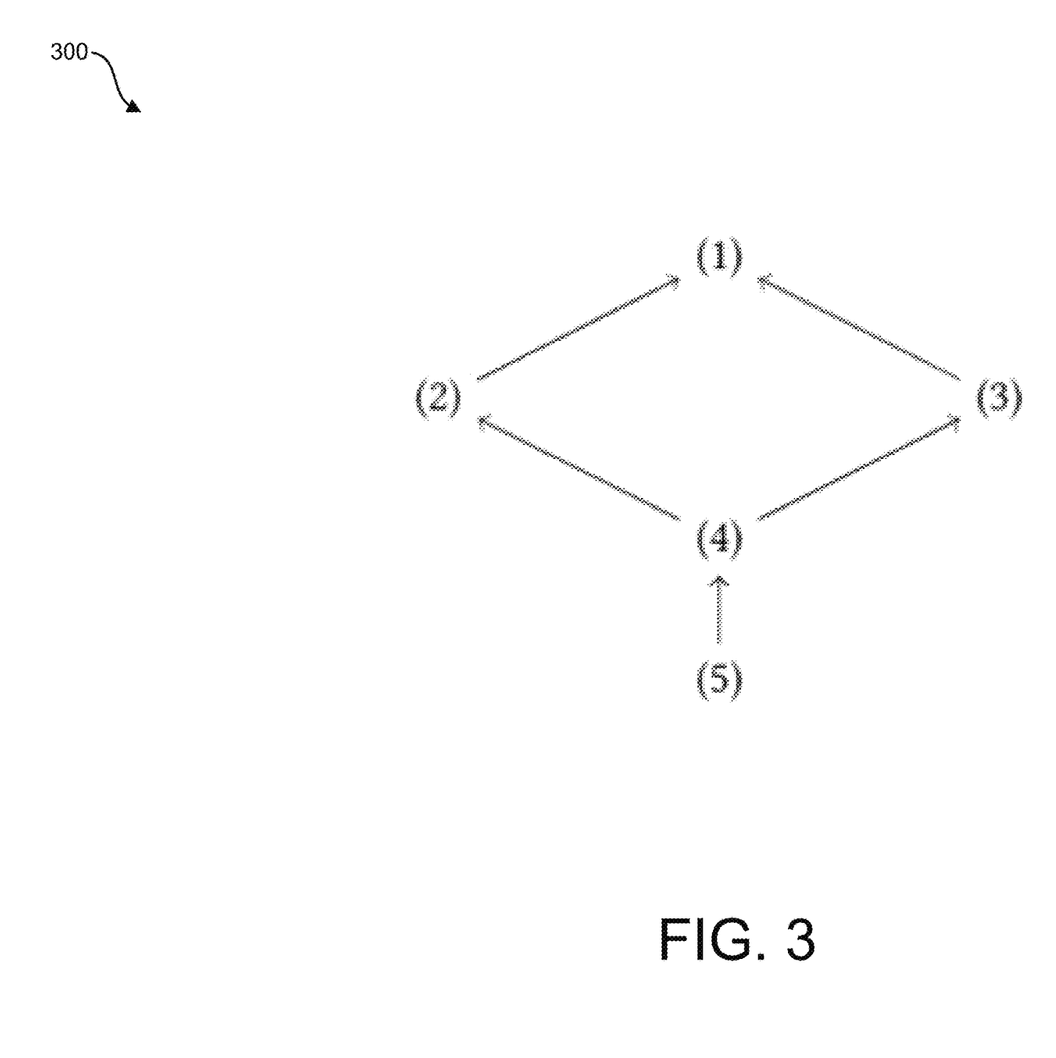
FIG. 3 is a diagram illustrating a specialization lattice with more general rule templates at the top and more specific rule templates at the bottom.

FIG. 3 is a diagram 300 illustrating a specialization lattice showing the interrelation of rule templates in which more general rule templates are at the top (rule templates (1)-(3) and more specific rule templates are at the bottom (rule templates (4)-(5)).

With each of the defined templates, a certain type of probabilistic regularity can be captured. Confidence can be used as a metric to estimate the probability that the rule makes correct predictions. The probability of a rule that instantiates template (2) tells us, for example, how probable it is that a certain activity (label) u appears after another activity (label) v. The probability of a (1)-rule expresses how probable it is that, if an activity v is used in a process, another activity in that process is u.

Rules from these two templates are in an entailment relation. Any instantiation that maps u and v to the same labels, results in two rules such that the instantiation of (2) is more special then the instantiation of type (1). This is true due to the fact that inSameProcess (X, Y)→after (X, Y) is always true. Whenever a rule r is more special than a rule r', rule r tends to make fewer and more specific predictions compared to rule r'. The complete specialization lattice is shown in diagram 300 of FIG. 3. Most of the arcs in the specialization lattice can be explained by the simple rule shown above or the fact that the body of one rule is a subset of another rule's body. Rules that instantiate template (5) are the most specific rules.

The standard measure to estimate the quality of a rule is the confidence of a rule. For each concrete rule, which is an instantiation of one of the templates listed above, its confidence needs to be computed. In Definition 3, which is provided below, support and confidence are defined.

Definition 3 (Support and Confidence). Let r be a rule instantiating one of the templates (3) to (5). Let further r^ denote the head of r and let r˅ denote the body of r. Assume that X is the variable used in the head, and let X, Y (and Z) be the variables used in the body. Support and confidence of r can be defined as $$\text{support}(r) = |\{\theta_X \mid \exists\, \theta_{YZ} \hat{r}\theta_{XYZ} \wedge \hat{r}\theta_X\}|$$

$$\text{conf}(r) = \frac{|\{\theta_X \mid \exists\, \theta_{YZ} \hat{r}\theta_{XYZ} \wedge \hat{r}\theta_X\}|}{|\{\theta_X \mid \exists\, \theta_{YZ} \hat{r}\theta_{XYZ}\}|}$$

where $\theta\Sigma$ refers to a grounding for a variable $\Sigma$ or to a grounding for a set of variables $\Sigma$. With respect to rules instantiating templates (1) and (2), a modified definition can apply in which Z is suppressed.

Note that the possible groundings are determined by the given dataset, in this case a collection of process models B. According to this definition the support of a rule can be computed by counting all different groundings that make both the head and the body of the rule true. However, these groundings have to be projected to the head variable. To compute the confidence of a rule, its support needs to be divided by the number of those groundings that make the body true. Thus, the confidence of the rule can be understood as the probability that the rule makes a correct prediction within the given repository of business process graphs B.

According to this definition, a rule with many body groundings can have the same confidence as a rule with only few body groundings, e.g., $3/4 = 750/1000$. Moreover, there will be many rules with few groundings. This holds for rules that belong to the templates with two body atoms. For that reason it can happen that some rules with few groundings have a confidence that is coincidentally too high. In order to circumvent this, a constant 1 can be added to the denominator as a kind of pessimistic Laplace smoothing. This results, for example, in a smoothed confidence score of $0.5=1/(1+1)$ for the extreme case of a rule that has one true body grounding resulting in a true head.

Given an incomplete business process graph B with its unlabeled node $n\hat{}$, rules learned from B can be used and applied on $n\hat{}$ given the knowledge about what has been modelled so far in B. For doing this, $X=n\hat{}$ is set for all rules that have been learned, and the resulting body can be checked to determine if it is true. Here is an example for a specific rule, which is also the rule that results in the top-ranked recommendation shown in FIG. 1, where $n\hat{}$ is the rightmost node.

submitpurchaseorder ($n\hat{}$)→after ($n\hat{}$, Y), quotationreceived (Y),
inSameProcess (Y, Z), inquire (Z)

For better readability, the long label 'inquireaboutavailabilityofproducts' can be replaced by the abbreviation 'inquire'. If the body of the rule is compared to FIG. 1, it can be seen that the body of this partially instantiated rule is indeed true as Y and Z can be mapped to nodes that have the respective labels. Thus, the rule recommends 'submitpurchaseorder' as label for $n\hat{}$. This recommendation is weighted via the smoothed confidence of the rule, which is $11/(11+1)=0.916$.

The same operations can be applied to all rules and the recommendations of the rules can be collected where the body was true with respect to the given incomplete model B. If several rules make the same recommendation (in other words: predict the same label), the maximum confidence can be assigned to this recommendation. Instead of taking the maximum confidence, other aggregation methods are possible. For example, it is possible to use an aggregation method that is based on a noisy-or or an aggregation method that also takes the interrelations between the rule templates illustrated in diagram 300 in FIG. 3 into account.

The aggregation of the confidence values of several rules that make the same prediction results in a set of recommendations together with their maximum confidence. Recommendations from the set can be removed that refer to a label that is already used in B, because, in most cases, an activity does not appear twice in the same model. As it is known that at most one of the recommendations in the set of recommended activities is true, the confidence scores can be normalized such that their sum equals 1. This changes the score for the label 'submitpurchaseorder' from 0.916 to 0.52.

One of the technical advantages of the current approach is the capability of explaining the resulting recommendation. With respect to the given top-recommendation such an explanation can be phrased like this: Whenever the previous activity is 'quotationreceived', and somewhere else in the process appears an activity 'inquireaboutavailabilityofproducts', then this is a rather strong signal (normalized score of 0.52) that the current activity should be labelled 'submitpurchaseorder'. Such an explanation might raise the confidence of the user in the given recommendation and might make it easier for her to make a decision between the presented alternatives. In addition, the recommender system can also provide links (in the browser window or a pop up window in the graphical user interface) to the business process models in the repository that led to the top-recommendation due to the fact that one (or more) of the corresponding rules is true for them. The user could hence have a look at similar processes, which might help her with her own modeling task.

Figure 4:
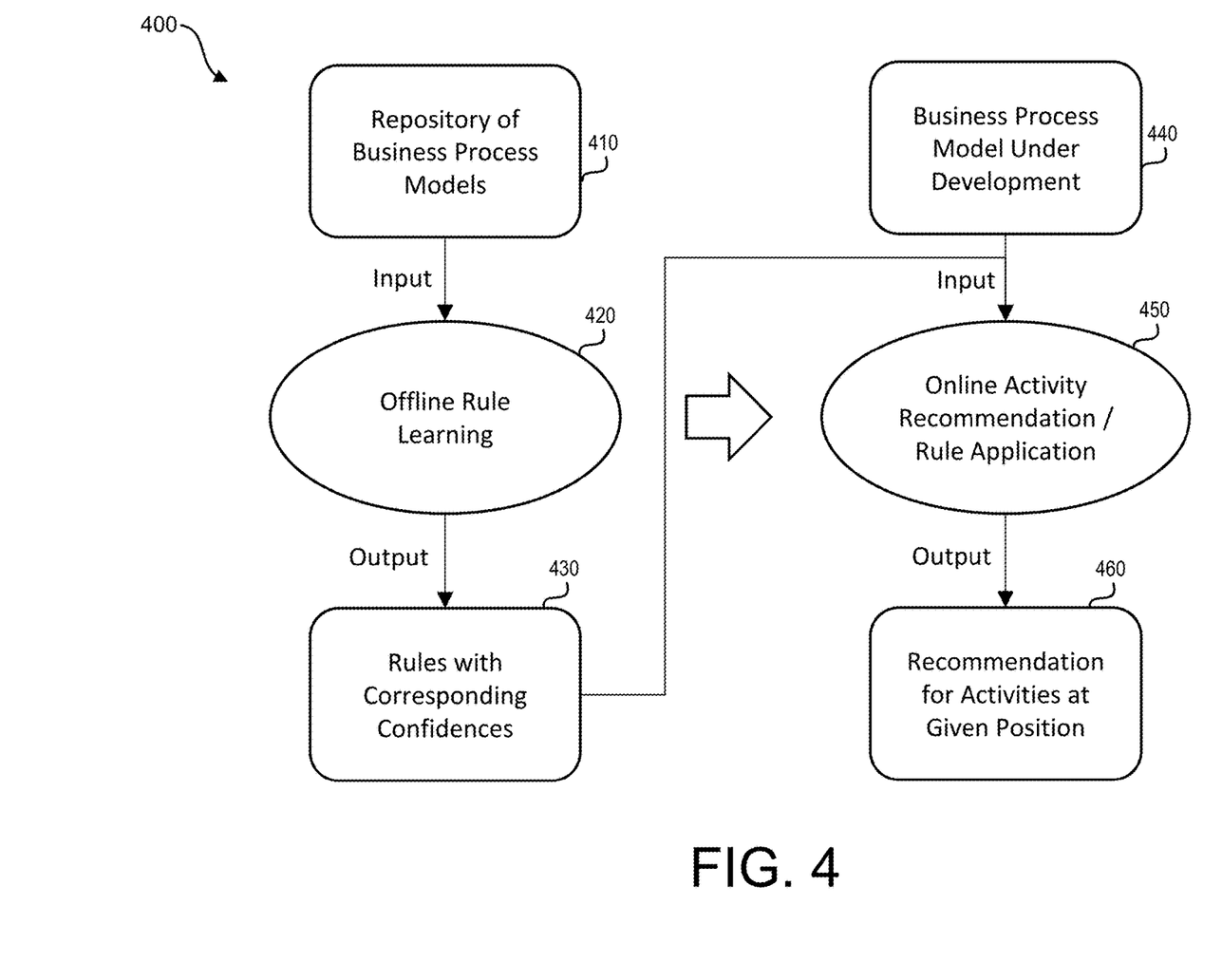
FIG. 4 is a diagram illustrating a design time phase and a runtime phase associated with activity recommendation within a software-based process modeling tool while modeling a business process.

FIG. 4 is a diagram 400 illustrating two phases relating to activity recommendation including a design time phase in which rules are generated with corresponding confidence levels 430 and a runtime phase in which a recommendation engine provides recommendations for a given position within a business process under development 460. As described above, a repository of business process models 410 can be accessed as part of an offline rule learning process 420. The offline rule learning process 420 can include applying a plurality of rule templates to historical business process models within the repository 410 so that the (instantiated) rules with confidence values 430 can be generated. These rules with confidence levels 430 in turn, are used by a recommendation engine to provide an online activity recommendation/rule application 450 for a business process model under development 440. The rules 430 can, for example, be applied to information associated with the business process model under development 440 (e.g., the various nodes and their interrelationships, etc.) in order to identify a recommendation for a next node/unlabeled node within the business process model under development 440. These activity recommendations can be displayed in a variety of manners in the graphical user interface of the software-based modeling tool.

Figure 5:
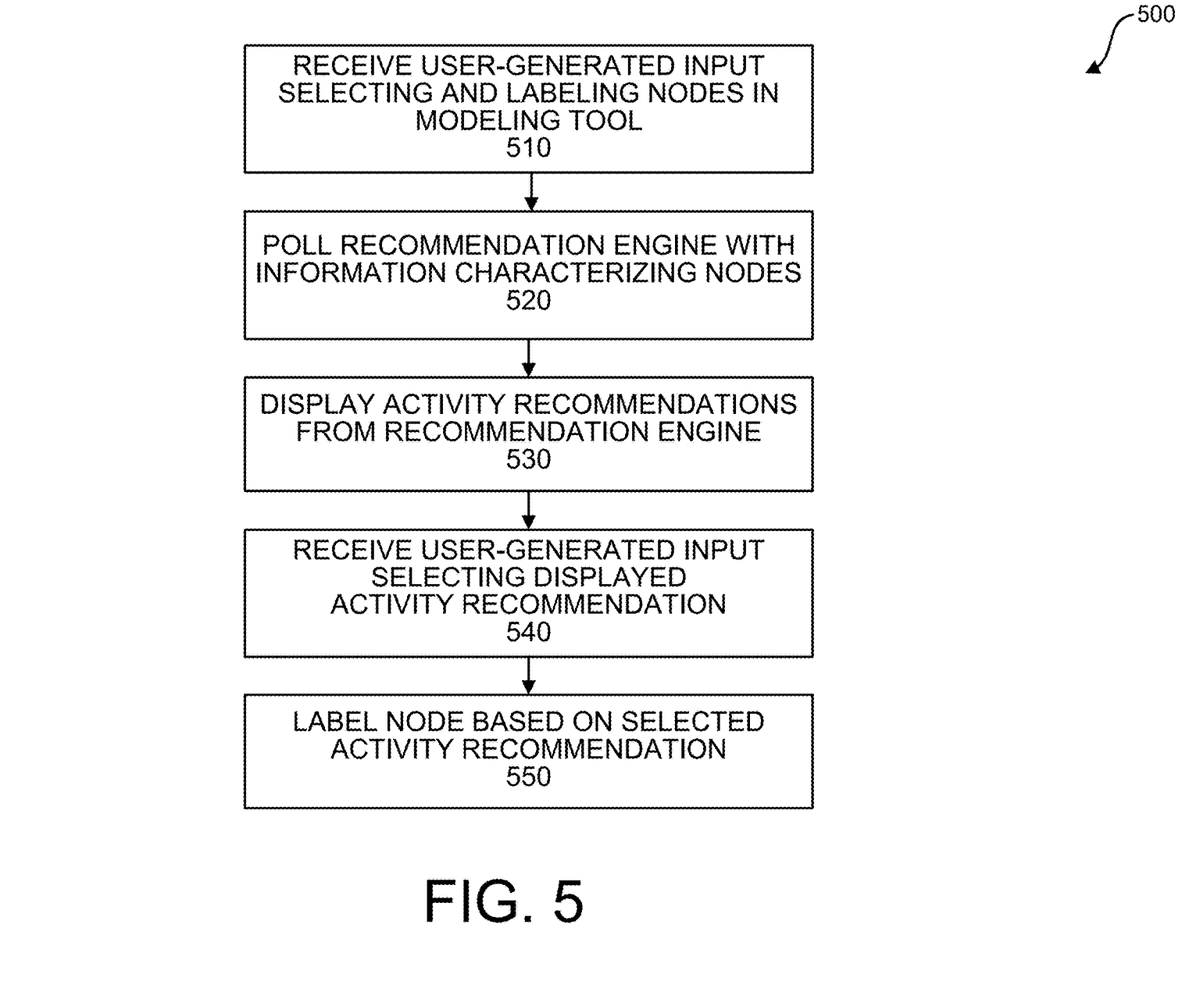
FIG. 5 is a process flow diagram illustrating activity recommendation within a software-based process modeling tool while modeling a business process.

FIG. 5 is a process flow diagram 500 in which, at 510, user-generated input is received via a graphical user interface forming part of a software-based process modeling tool that labels and links a plurality of activities forming part of a process. The modeling tool can provide that the activities are each represented as a node in the graphical user interface. Subsequently, at 520, a recommendation engine is polled with information characterizing the labeled activities and their links to obtain a plurality of ranked recommendations for an unlabeled node representing a next activity in the process. The recommendation engine applies the information characterizing the labeled activities and their links to a plurality of rules each having a corresponding confidence value. The plurality of rules is generated using a plurality of rule templates as applied to a plurality of historical processes. The historical processes each comprise a plurality of labeled and linked activities. At least a portion of the ranked activity recommendation are then displayed, at 530, in the graphical user interface. In response to second user-generated input received, at 540, via the graphical user interface forming part of the software-based modeling tool, one of the displayed ranked activity recommendations is selected. The unlabeled node in the graphical user interface is then labeled, at 550, with an activity corresponding to the selected displayed ranked recommendation.

Figure 6:
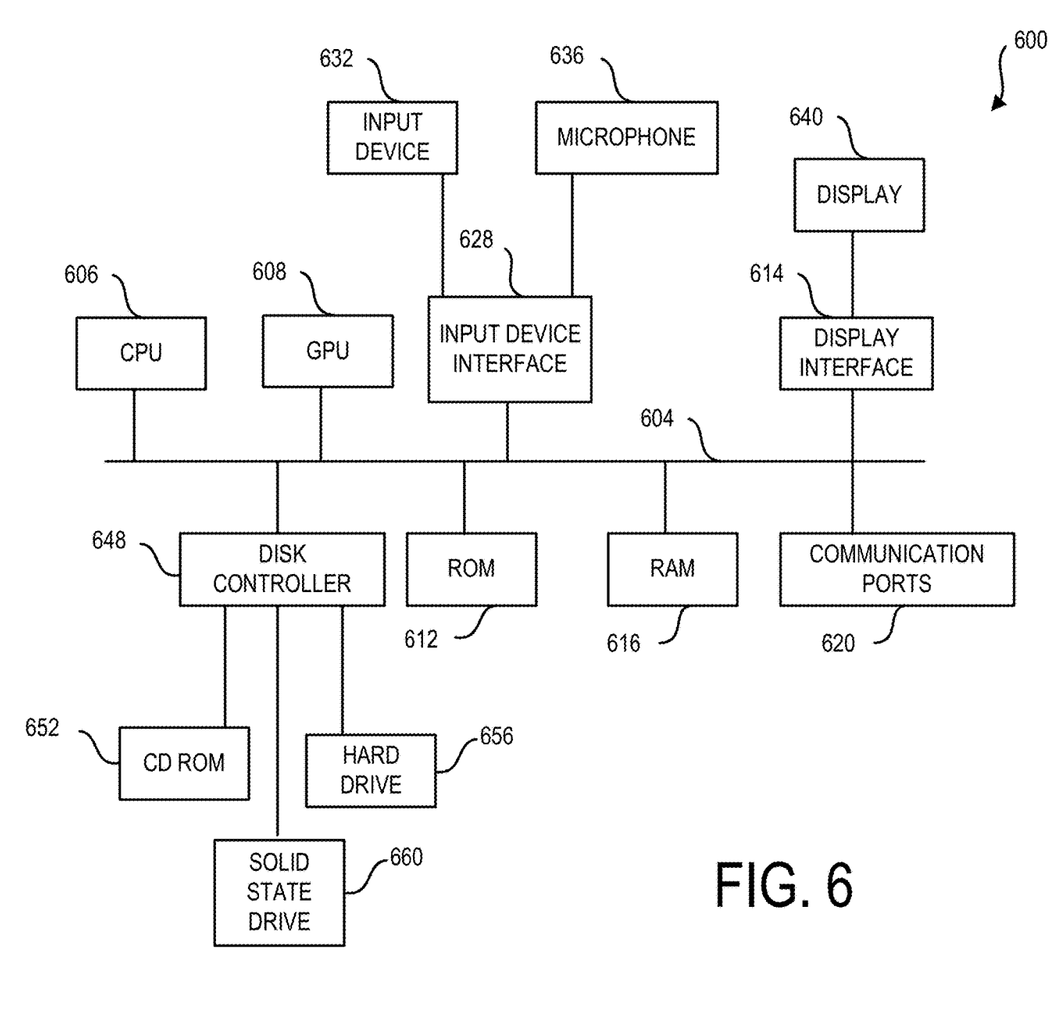
FIG. 6 is a diagram illustrating a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
 receiving a user-generated input via a graphical user interface, the graphical user interface forming part of a software-based process modeling tool, the user-generated input indicating:
  a plurality of activities forming part of a process that is being modeled,
  corresponding labels for labeled activities of the activities, and
  links between the activities,
  the activities each being represented as a node in the graphical user interface;
 polling a recommendation engine with information characterizing the labeled activities and their corresponding links;
 determining, by the recommendation engine:
  a plurality of rules for the labeled activities of the process being modeled by applying the information characterizing the labeled activities and their corresponding links,
  a corresponding confidence value for each of the plurality of rules, and
  a plurality of ranked recommendations of suggested labels for an unlabeled node representing a next activity in the process based, at least partially, on rules determined for the labeled nodes of the process,
  wherein the plurality of rules are generated using a plurality of rule templates as applied to a plurality of historical processes, the historical processes each comprising a plurality of labeled and linked activities;
 displaying, in the graphical user interface, the process in a graphical form displaying the labeled activities, the labels corresponding to the labeled activities, the links between the activities, and the unlabeled node representing the next activity;
 displaying two or more of the suggested labels of the plurality of ranked recommendations in the graphical user interface as a graphical user interface list of selectable options;
 receiving a second user-generated input via the graphical user interface, the second user-generated input comprising a selection of a suggested label of the displayed suggested labels of the plurality ranked recommendations from the graphical user interface list of selectable options; and
 updating, in the graphical user interface, the displaying of the displayed process in the graphical form by displaying the suggested label of the received selection as a label corresponding to the unlabeled node.

2. The method of claim 1, wherein each historical process is represented as a business process graph.

3. The method of claim 2, wherein each business process graph is represented as a set of logical formulas.

4. The method of claim 2 further comprising:
 for each node n of the business process graph corresponding to the process being modeled, using a unary predicate $\lambda n$ that corresponds to the label $\lambda(n)$ of n and adding a formula $\lambda n$ (n).

5. The method of claim 4 further comprising:
 for each relation type rel between two nodes $n \neq m$ of a business process graph describing the structure of a given process model, using a binary predicate rel and for each pair of nodes $n \neq m$ of the business process graph that are in a relation described by relation rel adding a formula rel (n, m).

6. The method of claim 1 further comprising:
 defining a set of rule templates for which all occurring rule instantiations are generated and computing confidences of the generated rules.

7. The method of claim 1, wherein each rule has a form of a Horn rule and predicts a label of an activity within the process being modeled.

8. The method of claim 1, wherein each rule template comprises a head and a body.

9. The method of claim 8, wherein each head comprises a unary predicate indicating a label of a business process graph.

10. The method of claim 9, wherein each body comprises binary predicates indicating interrelationships between two nodes of the business process graph and unary predicates each indicating labels of a node in the business process graph.

11. A system comprising:
 at least one data processor; and
 memory storing instructions which, when executed by the at least one data processor, result in operations comprising:
  receiving a user-generated input via a graphical user interface, the graphical user interface forming part of a software-based process modeling tool, the user-generated input indicating:
   a plurality of activities forming part of a process that is being modeled,
   corresponding labels for labeled activities of the activities, and
   links between the activities,
   the activities each being represented as a node in the graphical user interface;
  polling a recommendation engine with information characterizing the labeled activities and their corresponding links;
  determining, by the recommendation engine:
   a plurality of rules for the labeled activities of the process being modeled by applying the information characterizing the labeled activities and their corresponding links,
   a corresponding confidence value for each of the plurality of rules, and
   a plurality of ranked recommendations of suggested labels for an unlabeled node representing a next activity in the process based, at least partially, on rules determined for the labeled nodes of the process,
   wherein the plurality of rules are generated using a plurality of rule templates as applied to a plurality of historical processes, the historical processes each comprising a plurality of labeled and linked activities;

displaying, in the graphical user interface, the process in a graphical form displaying the labeled activities, the labels corresponding to the labeled activities, the links between the activities, and the unlabeled node representing the next activity;

displaying two or more of the suggested labels of the plurality of ranked recommendations in the graphical user interface as a graphical user interface list of selectable options;

receiving a second user-generated input via the graphical user interface, the second user-generated input comprising a selection of a suggested label of the displayed suggested labels of the plurality ranked recommendations from the graphical user interface list of selectable options; and updating, in the graphical user interface, the displaying of the displayed process in the graphical form by displaying the suggested label of the received selection as a label corresponding to the unlabeled node.

12. The system of claim 11, wherein each historical process is represented as a business process graph.

13. The system of claim 12, wherein each business process graph is represented as a set of logical formulas.

14. The system of claim 12, wherein the operations further comprise:
for each node n of the business process graph corresponding to the process being modeled, using a unary predicate $\lambda n$ that corresponds to the label $\lambda(n)$ of n and adding a formula $\lambda n$ (n).

15. The system of claim 14, wherein the operations further comprise:
for each relation type rel between two nodes n≠m of a business process graph describing the structure of a given process model, using a binary predicate rel and for each pair of nodes n≠m∈N of the business process graph that are in a relation described by relation rel adding a formula rel (n, m).

16. The system of claim 11, wherein the operations further comprise:
defining a set of rule templates for which all occurring rule instantiations are generated and computing confidences of the generated rules.

17. The method of claim 11, wherein each rule has a form of a Horn rule and predicts a label of an activity within the process being modeled.

18. The method of claim 11, wherein each rule template comprises a head and a body.

19. The system of claim 18, wherein:
each head comprises a unary predicate indicating a label of an activity node in a business process graph; and
each body comprises binary predicates indicating inter-relationships between two nodes of the business process graph and unary predicates each indicating labels of a node in the business process graph.

20. An article comprising a non-transitory computer-readable medium on which instructions are stored, the instructions being executable by at least one processor to cause the at least one processor to perform operations comprising:
receiving a user-generated input via a graphical user interface, the graphical user interface forming part of a software-based process modeling tool, the user-generated input indicating:
a plurality of activities forming part of a process that is being modeled,
corresponding labels for labeled activities of the activities, and
links between the activities,
the activities each being represented as a node in the graphical user interface;
determining, by a recommendation engine, based on information characterizing the labeled activities and their corresponding links:
a plurality of rules for the labeled activities of the process being modeled by applying the information characterizing the labeled activities and their corresponding links,
a corresponding confidence value for each of the plurality of rules, and
a plurality of ranked recommendations of suggested labels for an unlabeled node representing a next activity in the process based, at least partially, on rules determined for the labeled nodes of the process,
wherein the plurality of rules are generated using a plurality of rule templates as applied to a plurality of historical processes, the historical processes each comprising a plurality of labeled and linked activities;

displaying, in the graphical user interface, the process in a graphical form displaying the labeled activities, the labels corresponding to the labeled activities, the links between the activities, and the unlabeled node representing the next activity;

displaying two or more of the suggested labels of the plurality of ranked recommendations in the graphical user interface as a graphical user interface list of selectable options;

receiving a second user-generated input via the graphical user interface, the second user-generated input comprising a selection of a suggested label of the displayed suggested labels of the plurality ranked recommendations from the graphical user interface list of selectable options; and updating, in the graphical user interface, the displaying of the displayed process in the graphical form by displaying the suggested label of the received selection as a label corresponding to the unlabeled node.

* * * * *